United States Patent [19]

Jablonsky et al.

[11] 4,202,249
[45] May 13, 1980

[54] POWER STEERING MECHANISM CONTROL VALVE

[75] Inventors: Erich Jablonsky, Bobingen; Dieter Elser, Essingen-Lauterburg, both of Fed. Rep. of Germany

[73] Assignee: Zahnradfabrik Friedrichshafen AG, Friedrichshafen, Fed. Rep. of Germany

[21] Appl. No.: 826,989

[22] Filed: Aug. 23, 1977

[30] Foreign Application Priority Data

Aug. 28, 1976 [DE] Fed. Rep. of Germany ....... 2638981

[51] Int. Cl.² .................... F15B 13/04; F15B 13/14
[52] U.S. Cl. ......................................... 91/422; 91/380;
  137/625.62; 180/146
[58] Field of Search ............... 91/434, 422, 222, 380;
  137/625.62; 180/146, 147

[56] References Cited

U.S. PATENT DOCUMENTS

| | | | |
|---|---|---|---|
| 3,602,101 | 8/1971 | Jablowsky et al. | 91/422 |
| 3,688,644 | 9/1972 | Cusveller | 91/422 |
| 3,814,131 | 6/1974 | Takahashi et al. | 137/625.62 |

FOREIGN PATENT DOCUMENTS

2327535  12/1974  Fed. Rep. of Germany ........... 180/146

*Primary Examiner*—Irwin C. Cohen
*Attorney, Agent, or Firm*—Zalkind & Shuster

[57] ABSTRACT

A steering control valve and worm nut centering device for a power steering booster mechanism control valve is provided comprising a flexure rod carried either by the double-acting piston member or the worm nut member and extending between those members or into the valve spool. The overall construction is conventional and well known, the particular feature of the invention being a flexure rod which is adjustable translationally or rotatively, in various modifications, to center the valve spool of the control valve and to center the worm nut. The flexure rod can be predetermined as to length, taper, alloy, and other design factors so as to flex to give a desired increase in road resistance feel substantially over and above that afforded by the usual size of reaction chambers and centering spring conventionally associated with the valve spool. Thus, a flexure characteristic curve of extent of flexure versus degree of steering provides a sharp increase in road resistance simulation as the steering spindle is turned.

17 Claims, 6 Drawing Figures

FIG. 5
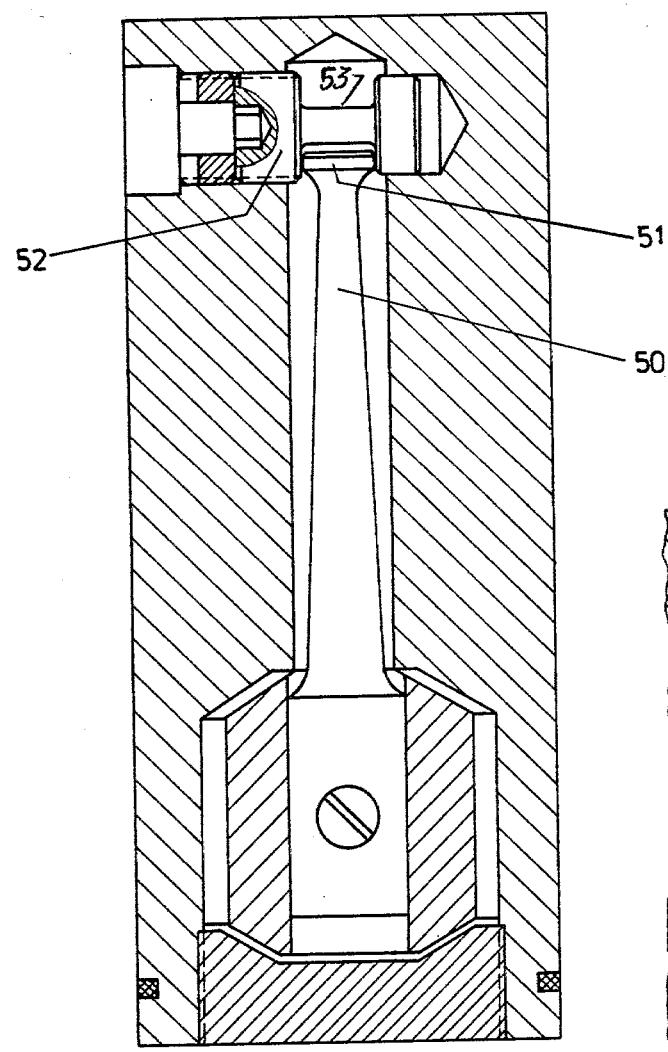
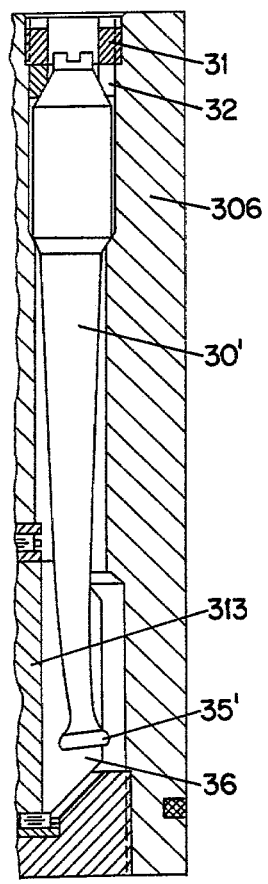
FIG. 6

POWER STEERING MECHANISM CONTROL VALVE

The invention in contrast to prior art centering devices utilizing a centering spring acting on the valve spool which has a linear characteristic and provides only a slight increase in road resistance simulation besides requiring two factors of variation, i.e., initial stress and size. A further advantage of the invention is the compactness afforded for the overall mechanism by the use of a simple flexure rod to provide increased road simulation feel to the driver as against a larger overall construction that would be necessitated by larger springs or larger reaction chambers. Additionally, the simplicity of the invention effects an economy in manufacture and the novelty of construction permits relative ease of adjustment of the flexure rod. Accordingly, the flexure rod serves the dual purpose of adjustable centering of the valve spool and worm nut to neutral, or straight ahead driving position as well as providing augmented and readily predeterminable road resistance simulation in executing a steering function, an effect which is changeable by merely changing the flexure rod to one of any desired flexure resistance characteristic.

The present invention constitutes an improvement over the previous patent of the same inventors, U.S. Pat. No. 3,602,101, issued Aug. 31, 1971, incorporated by reference herein, wherein as seen in FIGS. 5 and 8, a spring is utilized for valve spool centering purposes, it being noted that initial compression in the spring is adjustable only by removal of the piston from the cylinder for purposes of rotating the conically tipped adjusting screws as seen in FIG. 8 of the patent.

In the present invention, adjustment is readily effected without removal of the piston but merely by removal of the end cap of the double acting power boost cylinder to provide access to one end of the flexure rod.

It will be noted by comparison of the present application with the aforementioned patent that, except for the improvement to be described, mechanically and hydraulically all components are essentially the same, including the flow control paths provided by shifting of the spool valve and the actuation of the spool valve upon rotation of the steering spindle. The various channels to make up a complete hydraulic system are not shown herein nor are certain common elements described herein.

A detailed description of the invention now follows in conjunction with the appended drawing, in which:

FIG. 5 is a longitudinal section illustrating a further modification of centering adjustment means, otherwise the same as FIG. 4.

FIG. 6 is a fragmentary view similar to FIG. 3 showing a still further modification of adjustment means.

Figure 1:
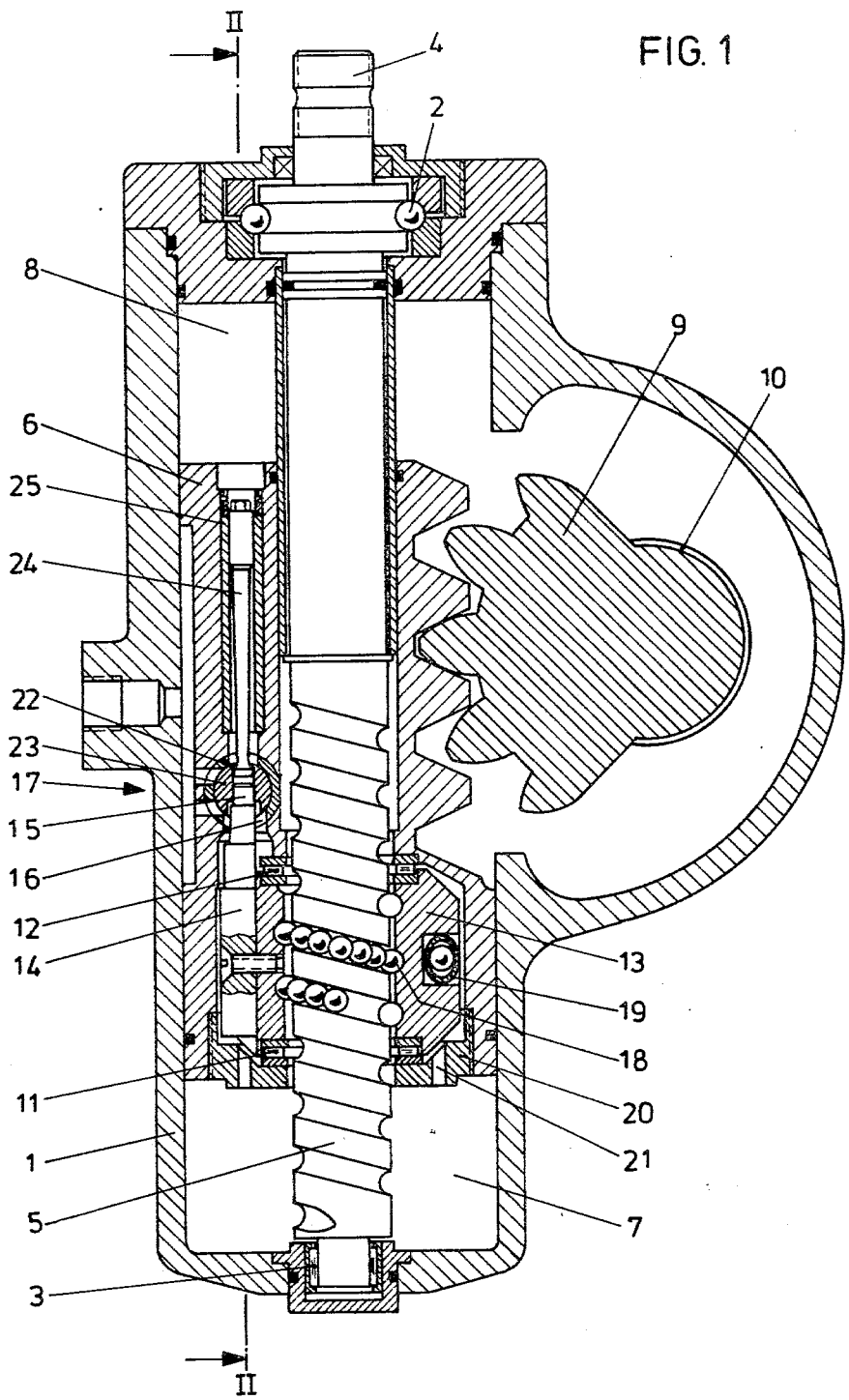
FIG. 1 is a longitudinal section through a power boost steering mechanism illustrating the flexure rod feature, which comprises the invention, having an end being carried by the piston member and having an end protruding into the valve spool.
Figure 2:
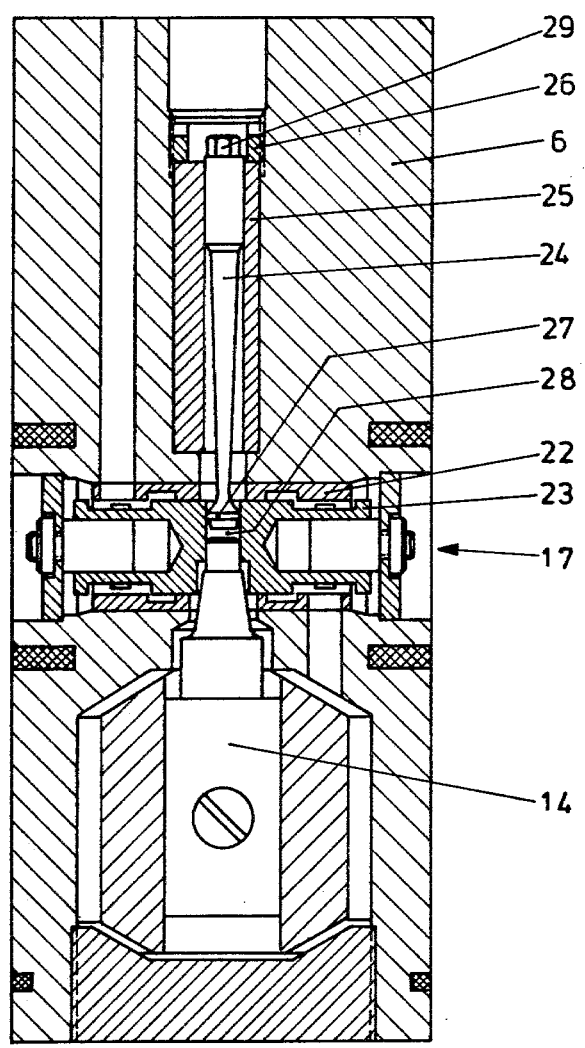
FIG. 2 is a partial longitudinal section on the line II—II of FIG. 1, magnified for clarity of detail of the centering adjustment means.

Referring now particularly to the form shown in FIGS. 1 and 2, wherein a steering spindle 4 which will be understood to connect to a steering wheel (not shown) passes through the removable closure end cap of a double acting cylinder housing 1, being supported at upper and lower ends by respective bearings 2 and 3. The lower part of the spindle 4 is threaded to effect the steering worm 5. A double acting piston member 6 divides housing 1 into pressure chambers 7 and 8, the piston having a gear rack meshing with gear segment 9 in chamber 8. Gear segment 9 will be understood to connect via a steering arm shaft 10 with tie rods (not shown) which are part of the steering linkage system, as is well understood. A worm nut member 13 having limited rotation carries actuating means such as a valve actuator means such as arm 14 extending longitudinally in piston 6, the worm nut being supported between a pair of thrust bearings 11 and 12. Actuator arm 14 has a driver pin 15 engaging an aperture 16 in the valve spool member 23 of the steering control valve 17. The control valve 17 which controls flow from a pressure source to either pressure chamber while exhausting the other is longitudinally oriented at right angles to the axis of the piston and off center.

Rotation of spindle 5 translates piston 6 in one direction or the other via steering worm 5 and the ball chain 18 and worm nut 13. The ball chain circulates in ball cage 19. Bearings 11 and 12 are secured in piston 6 by means of the threaded retainer ring 20 having the bores 21 which effect exhaust passages for chamber 8 and form a portion of the hydraulic circuitry.

Control valve 17 comprising the valve spool 23 reciprocal in a sleeve 22 carried in a side bore of the piston is movable from the neutral or straight ahead steering position within the limits provided by the diameter of aperture 16 abuttable by a portion of the body of the actuator arm 14.

All of the preceding description is well known and conventional and described in greater detail in U.S. Pat. No. 3,602,101, aforementioned, and no further description need be given here since the construction and operation is not critical to the precise invention disclosed in this application.

Still referring to FIGS. 1 and 2, the feature of the invention comprises flexure means such as a flexure rod 24 force fitted in an eccentric bore of a sleeve 25 and tapered as shown wherein the smaller end is provided with a spherical shaped head section or segment 27. The rod 24 and sleeve 25 are thus carried in piston 6 and the sleeve is secured against rotation by a threaded retainer ring 26 acting on the end of the sleeve as shown. Thus, by loosening ring 26 a suitable tool can grip the hex head 29 integral with the flexure rod and rotation thereof will rotate sleeve 25 whereby due to the eccentric mounting of the rod in that sleeve the spherical head 27 moves eccentrically to exert a side thrust to edges of an elongated aperture 28 in valve spool 23, when necessary, to shift the valve to an initial center position. This corresponds to a neutral or straight ahead steering position, it being understood that the aperture 28 is elongated normal to the plane of FIG. 2 to allow eccentric motion of the flexure rod wherein the spherical head closely fits between the side edges of the aperture without play or looseness in order to accurately position the valve spool. Tightening hex head 29 then effects a permanent position for sleeve 25 and thus valve spool 23.

It should be noted at this time that the flexure rod 24 is readily removable and any rod having a different reaction characteristic to flexure can be substituted with a minimum of disassembly. It will be apparent that a flexure rod can be designed to deflect to give any predetermined degree of road resistance feel proportionally and uniformly as a steering wheel is turned. Thus rotation of the steering spindle effects shifting of the valve spool 23 with respect to piston 6 and since the flexure rod is carried by piston 6 the rod must necessarily be flexed in one direction or the other into or out of the plane of the paper as viewed in FIG. 1 or the left and right as viewed in FIG. 2 as the valve spool shifts. The force for effecting such flexure is, of course, effected by the vehicle driver who senses such force as simulated road resistance to steering in proportion to the degree of rotation of the steering wheel.

Figure 3:
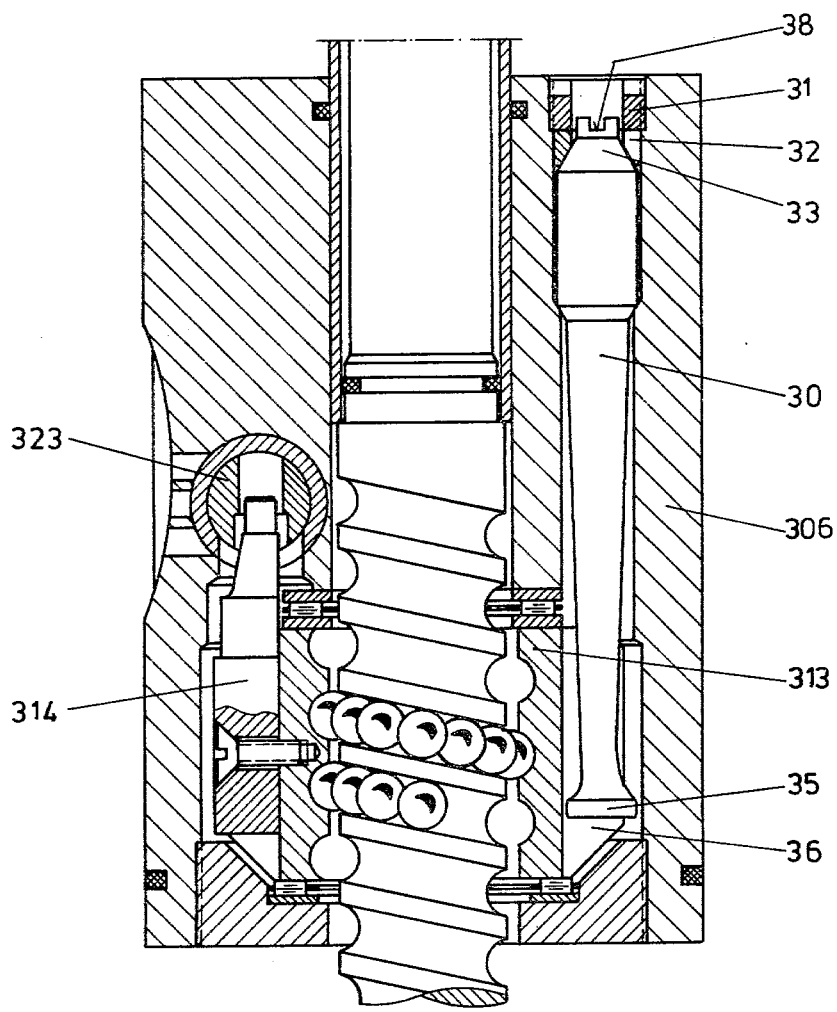
FIG. 3 illustrates a partial longitudinal section a modification of the centering adjustment means in which the flexure rod is carried by the piston member and coacts at its flexing end with the steering worm nut.

Referring now to FIG. 3, a flexure rod 30 is illustrated mounted rotatively in a longitudinal bore of piston 306 and secured by a threaded ring 31 via a split clamping collar 32 acting against the conical surface 33 of the rod body. The flexing end of the rod 30 has a spherical head 35 engaging without play or looseness in a longitudinal groove 36 of worm nut 313. Worm nut 313 is drivingly connected via acutator 314, which it carries, with the valve spool member 323. The axis of spherical segment head 35 is offset of the axis of rod 30 by an amount such that upon loosening threaded ring 31 a screw driver in slot 38 can rotate the rod and thus the offset head 35 to effect an adjusting rotation of worm nut 313 which via actuator 314 can shift valve spool 323 to a center position.

As an alternate construction instead of offsetting head 35 the tapered length of rod 30 could be bent to achieve offset of head 35.

Figure 4:
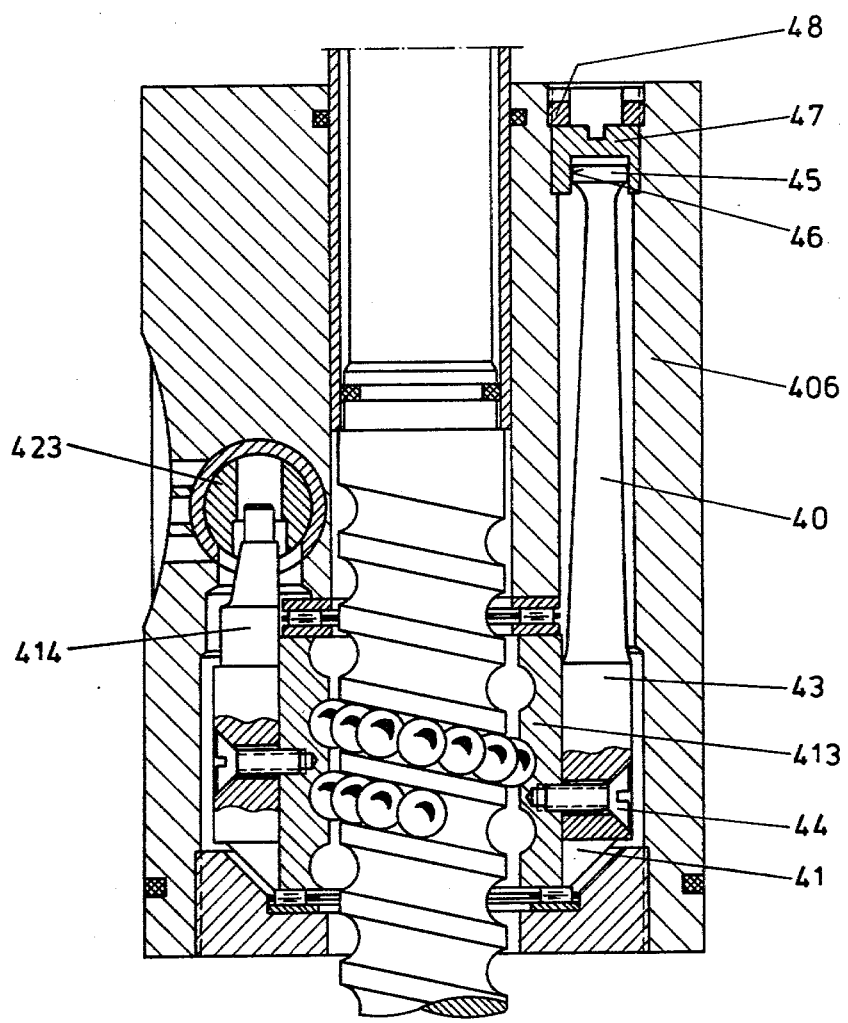
FIG. 4 is a longitudinal section through another modification of centering adjustment means illustrating coaction of the flexure rod at its flexible end with a double acting piston and being carried by the worm nut.

Referring now to FIG. 4, a flexure rod 40 is illustrated having a body portion 43 which is rectangular in shape and force fitted in a groove 41 of worm nut 413, being secured additionally by bolt 44 against possible shifting. Spherical head segment 45 of the rod is disposed free of play in an eccentrically provided blind bore 46 of a rotative adjusting cup 47 secured fixedly to piston 406, by threaded ring 48. The cup is provided with a kerf at its top surface, as shown, to take a tool whereby it can be rotated when ring 48 is loosened thereby rotating worm nut 413 and thus valve spool member 423 via actuator 414 to a centering position.

The modification shown in FIG. 5 is similar to that shown in FIG. 4, the particular feature illustrated being that the flexure rod 50 is translated for adjustment of the valve spool (not shown in FIG. 5) by a screw 52 in a bore transverse to the bore encompassing the rod. Screw 52 has a hex socket 52 for accommodating a tool to effect rotation, wherein the adjustment screw 52 has a peripheral groove 53 and has an end bearing supporting structure on the other side of the transverse bore as shown. The spherical segment head 51 of the flexure rod protrudes into the groove closely engaging the sides. Rotation of screw 52 translates rod 50 to center a valve spool in the manner previously described.

In the form shown in FIG. 6, wherein like reference numerals denote like parts as in FIG. 3, the flexure rod 30' is bent to effect an offset at 35' witnin the groove 36. Rotation of the rod effects rotative adjustment of worm nut 313 for valve centering, as will be apparent.

We claim:

1. In a power steering mechanism of the kind having a housing with pressure chambers and a double acting piston member (6, 306, 406,(406) therebetween and having a manually operated steering spindle entering said piston with a worm thread on said steering spindle and a coacting worm nut member (13, 313, 413, (413) therearound carried by said piston member with relative rotation and also having a mechanically actuated control valve comprising a valve spool member (23, 323, 423, (423) carried by said piston member with mechanical actuator means (14, 314, 414, (414) carried by said worm nut member connecting to said valve spool member for shifting said valve spool member upon rotation of said steering spindle, wherein rotation of said steering spindle effects said relative rotation of said worm nut member to stress a flexure means (24, 30, 40, 50, 60) during shifting of said valve spool member by said actuator means to control pressure and exhaust flow means for operating said piston; and wherein said flexure means is stressed upon occurrence of said relative rotation by rotation of said steering spindle; the improvement which comprises said flexure means comprising an elongated flexure rod (20, 30, 40, 50, 60) extending longitudinally of said piston and worm nut members and having an end secured to one (6, 306, 413,(413) of said members and an end movable with one of the other (13, 313, 406,(406) of said members, said movable flexure rod end moving when said valve spool member is being shifted by said relative rotation; said flexure rod being bendably stressed upon manual rotation of said steering spindle during said shifting of said valve spool member and said flexure rod having a predetermined flexing characteristic curve for force applied by said steering spindle and effecting steering resistance simulation during a steering operation and effecting entering of said valve spool subsequent to a steering operation; including adjusting means for adjusting the position of said flexure rod in order to adjust said valve spool member to a center or neutral position.

2. In a power booster steering mechanism as set forth in claim 1, siad flexure rod having a predetermined steep characteristic curve of flexure vs. flexing force applied via said steering spindle to effect sharp steering resistance simulation as the steering spindle is rotated and said flexure rod having an axis coplanar with the axis of said steering spindle.

3. In a power booster steering mechanism as set forth in claim 2, said flexure rod being tapered, the end of lesser diameter being connected to said valve spool.

4. In a power booster steering mechanism as set forth in claim 2, said flexure rod being carried by said piston member.

5. In a power booster steering mechanism as set forth in claim 2, said flexure rod being carried by said worm nut member.

6. In a power booster steering mechanism as set forth in claim 2, said flexure rod being tapered and having a head protruding into said valve spool, an aperture in said valve spool having edges between which said head fits without play at one side of said aperture, said actuator means comprising a pin extending into said aperture from an opposite side thereof.

7. In a power booster steering mechanism as set forth in claim 1, said adjusting means comprising a sleeve carried by said piston member and having an eccentric bore; said flexture rod being secured in said sleeve and means for rotating said sleeve to effect translational movement of said flexture rod to center said valve spool member.

8. In a power booster steering mechanism as set forth in claim 1, said adjusting means comprising a bore in said piston, said flexture rod being carried rotatively in said bore, a groove having side edges in said worm nut, said flexture rod having an end engaging said side edges in said groove and said end being offset of the rotary axis of said flexture rod, and means for rotating said flexture rod to effect an adjusted rotational position of said worm nut member whereby said actuator means adjusts said valve spool member to a neutral position.

9. In a power booster steering mechanism as set forth in claim 1, said flexture rod having an end secured to said worm nut member, a longitudinal bore in said piston member, said flexture rod extending into said bore and said adjusting means being carried by said piston member engaging said flexture rod and being adjustable to translate said flexture rod to effect rotation of said worm nut member thereby effecting shifting of said valve spool member by said actuator means to a center position.

10. In a power booster steering mechanism as set forth in claim 9, said adjusting means comprising a cap having an eccentric bore into which said flexture rod protrudes and means for effecting rotation of said cap to translate said flexture rod.

11. In a power booster steering mechanism as set forth in claim 9, said adjusting means comprising a transverse bore in said piston member intersecting said longitudinal bore, an adjusting screw having threaded connection in said transverse bore and engaging the end of said flexture rod whereby rotation of said screw translates said flexture rod.

12. In a power booster steering mechanism as set forth in claim 1, flexture rod having a predetermined characteristic curve of flexure vs. degree of steering rotation applied to said steering spindle.

13. In a power booster steering mechanism as set forth in claim 1, flexture rod being on an axis generally parallel to the axis of said piston member.

14. In a power booster steering mechanism as set forth in claim 1, said worm nut member having a side groove with side edges and said flexture rod having an offset head in said groove and engageable with said side edges, including means for rotating said flexture rod to effect an adjusted rotational position of said worm nut member whereby said actuator means adjusts said valve spool member to a neutral position.

15. In a power booster steering mechanism as set forth in claim 1, flexture rod being carried longitudinally of said piston member and means mounting said rod rotatively on said piston member; said worm nut member having radial edges wherein said flexture rod has an end engageable with said edges, said flexture rod having a bend whereby said end is offset of the rotary axis of said flexture rod; and adjustment means for rotating said flexture rod to rotate said worm nut member for shifting said valve spool member by said actuator means to a center position.

16. In a power booster steering mechanism as set forth in claim 1, said flexture rod being carried longitudinally of said piston member and thereon, means rotatively supporting said rod, means connecting an end of said rod with said worm nut member whereby rotation of said flexture rod effects rotation of said worm nut member to adjust centering of said valve spool member, and means for securing said flexture rod nonrotatively after adjustment comprising a conical end on said flexure rod and a split collar engageable with said conical end; a threaded member carried by said piston member and operable to clamp said split collar against said conical end to hold an adjusted position.

17. In a power steering mechanism of the kind having a housing with pressure chambers and a double acting piston member therebetween and having a manually operated steering spindle entering said piston member with a worm thread on said steering spindle and a coacting worm nut member therearound carried by said piston member with relative rotation and also having a mechanically actuatable control valve comprising a valve spool member carried by said piston member with mechanical actuator means carried by said worm nut member connecting to said valve spool member for shifting said valve spool member upon rotation of said steering spindle, wherein rotation of said steering spindle effects said relative rotation of said worm nut member to stress flexure means during shifting of said valve spool member by said actuator means to control pressure and exhaust flow means for operating said piston; and wherein said flexure means is stressed upon occurrence of said relative rotation by manual rotation of said steering spindle;

the improvement which comprises- said flexure means having a generally straight elongated bendable flexure rod having a first end secured to one of said members and a second end movable with one of the other of said members and having a predetermined flexing characteristic curve for force applied by said steering spindle and effecting steering resistance simulation during a steering operation and effecting centering of said valve spool member subsequent to a steering operation; including adjusting means for adjusting the position of said flexure rod in order to adjust said valve spool member to a center or neutral position.

* * * * *